US005505272A

United States Patent [19]
Clark

[11] Patent Number: 5,505,272
[45] Date of Patent: Apr. 9, 1996

[54] DRILL BITS

[76] Inventor: Ian E. Clark, 17 Bellever Hill, Camberley, Surrey, England

[21] Appl. No.: 247,035

[22] Filed: May 20, 1994

[30] Foreign Application Priority Data

May 21, 1993 [GB] United Kingdom .................... 9310500

[51] Int. Cl.$^6$ .................................................. E21B 10/48
[52] U.S. Cl. ..................... 175/405.1; 76/108.2; 175/430; 175/431; 175/432
[58] Field of Search ..................................... 175/430, 431, 175/428, 434, 432, 405.1, 405, 404, 403; 407/118, 119, 56; 408/144, 145; 76/108.6, 108.1, 108.2

[56] References Cited

U.S. PATENT DOCUMENTS

| | | | |
|---|---|---|---|
| 4,156,329 | 5/1979 | Daniels et al. | 175/426 X |
| 4,928,777 | 5/1990 | Shirley-Fisher | 175/430 |
| 4,981,183 | 1/1991 | Tibbitts | 175/405.1 |
| 5,016,718 | 5/1991 | Tandberg | 175/404 X |
| 5,025,874 | 6/1991 | Barr et al. | 175/430 |
| 5,180,022 | 1/1993 | Brady | 175/431 X |
| 5,195,403 | 3/1993 | Sani et al. | 76/108.6 |
| 5,195,404 | 3/1993 | Notter et al. | 76/108.6 |
| 5,232,320 | 8/1993 | Tank et al. | 408/145 |
| 5,272,940 | 12/1993 | Diskin | 76/108.6 |

FOREIGN PATENT DOCUMENTS

| | | | |
|---|---|---|---|
| 0009315 | 8/1979 | European Pat. Off. . | |
| 3407427 | 8/1985 | Germany | 175/434 |
| 54-73389 | 6/1979 | Japan . | |
| 321844 | 6/1983 | Japan . | |
| 5-6003 | 2/1993 | Japan . | |
| 1495427 | 7/1989 | U.S.S.R. | 175/405.1 |
| 1537000 | 12/1978 | United Kingdom | 175/426 |
| 9214906 | 9/1992 | WIPO | 175/430 |

OTHER PUBLICATIONS

Dr. I. E. Clark, (1993) "PCD Wood Tools—A New Design Concept", *IDR*, 73–76.

Primary Examiner—Hoang C. Dang
Attorney, Agent, or Firm—Scully, Scott, Murphy & Presser

[57] ABSTRACT

A novel form of drill bit is disclosed. The bit (30) comprises a bit body having a leading face (32) and gauge surface (44, 46). Cutting inserts (32, 34, 36) are set into the bit body, each cutting insert being in the form of a segment of a composite PCD (polycrystalline diamond) or PCBN (polycrystalline cubic boron nitride) composite. Thus each insert has a PCD or PCBN compact (40) carried by a carbide backing (42). The PCD or PCBN compact of each insert is exposed at the leading face or at the gauge surface to perform an axial cutting or gauge maintenance function during drilling.

5 Claims, 2 Drawing Sheets

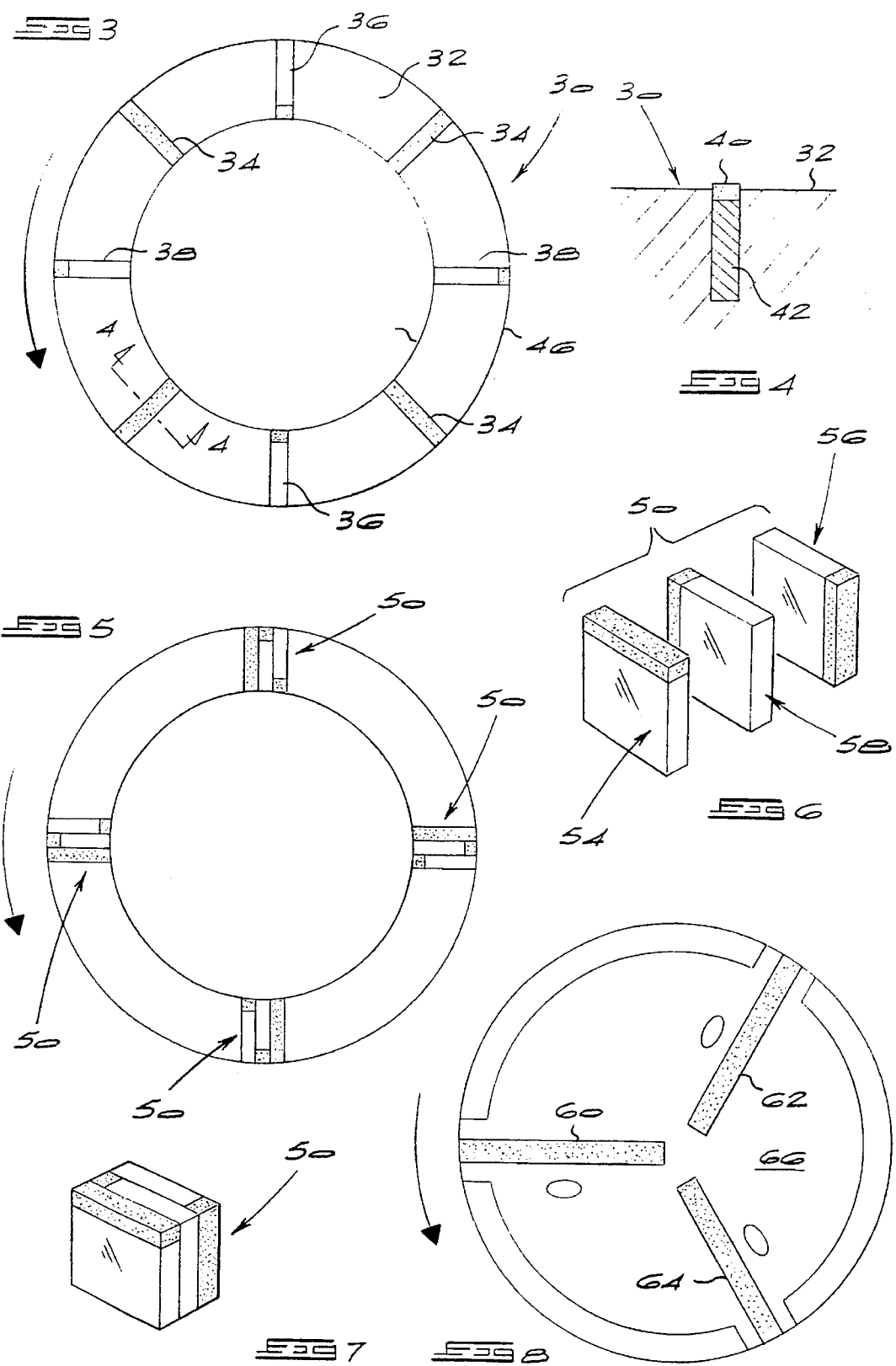

DRILL BITS

BACKGROUND TO THE INVENTION

This invention relates to drill bits, including coring bits used to extract sample cores from the earth, and non-coring bits used to drill holes into the earth.

A known coring bit has a tubular steel body with a leading end adapted to perform a cutting operation and a trailing end adapted to be connected to the leading end of a tubular drill string. The leading edge of the bit typically carries abrasive particles. Commonly used non-coring bits usually have abrasive buttons or cutting inserts set into their leading or working face.

An object of the present invention is to provide novel forms of drill bit for coring and non-coring applications.

SUMMARY OF THE INVENTION

According to the present invention there is provided a drill bit comprising:
   a bit body having a leading face and at least one gauge surface, and
   a series of cutting inserts set into the bit body, each cutting insert being in the form of a segment cut from a slice of a composite PCD or PCBN compact of flat proportions, and each cutting insert including a PCD or PCBN compact carried by a carbide backing, the PCD or PCBN compact of each insert being exposed at the leading face or at a gauge surface of the bit body.

In one embodiment of the invention wherein the drill bit is a coring bit in which the bit body is of tubular shape with inner and outer gauge surfaces, it is preferred that some of the cutting inserts are arranged with their PCD or PCBN compacts exposed at the leading face to perform an axial drilling action, some of the cutting inserts are arranged with their PCD or PCBN compacts exposed at the inner gauge surface to perform an inner gauge maintenance action, and some of the cutting inserts are arranged with their PCD or PCBN compacts exposed at the outer gauge surface to perform an outer gauge maintenance action.

In this embodiment, the cutting inserts may be identical but arranged at different orientations to provide for exposure of PCD or PCBN compacts at the leading face and inner and outer gauge surfaces. The cutting inserts may be arranged singly or in clusters of three inserts each. In the latter case, the three cutting inserts in each cluster are arranged for their PCD or PCBN compacts to be exposed at the leading face and inner and outer gauge surfaces respectively.

In another embodiment, wherein the drill bit is a non-coring bit it is preferred that the cutting inserts are arranged with their PCD or PCBN compacts exposed at the leading face and that the inserts extend substantially radially from positions at or near the axis of the bit towards the periphery of the leading face. Advantageously, the cutting inserts are arranged for their PCD or PCBN compacts to sweep out the full area of a circle when the bit is rotated about its axis. This can be achieved in a convenient manner if the cutting inserts have different radial lengths and extend towards the periphery of the leading face from respective positions at different distances from the axis of the bit.

According to a second aspect of the present invention there is provided a method of manufacturing a drill bit, the method comprising forming cutting inserts by cutting segments from elongate slices of a composite PCD or PCBN compact so that each segment has a PCD or PCBN compact carried by a carbide backing, and setting the inserts into a drill bit body having a leading face and at least one gauge surface, so that each cutting insert has its PCD or PCBN compact exposed at the leading face or at a gauge surface of the bit body.

BRIEF DESCRIPTION OF THE DRAWINGS

The invention will now be described in more detail, by way of example only, with reference to the accompanying drawings in which:

FIG. 3 shows an axial view on the face of a coring drill bit according to the invention;

FIG. 4 shows a cross-section at the line 4—4 in FIG. 3;

FIG. 5 shows an axial view on the face of another embodiment of coring drill bit according to the invention;

FIG. 6 shows an exploded perspective view of a cutting insert assembly as used in the FIG. 5 bit;

FIG. 7 shows the cutting insert assembly of FIG. 6 in assembled form; and

FIG. 8 shows an axial face view of a non-coring drill bit according to the invention.

DESCRIPTION OF EMBODIMENTS

Figure 1:
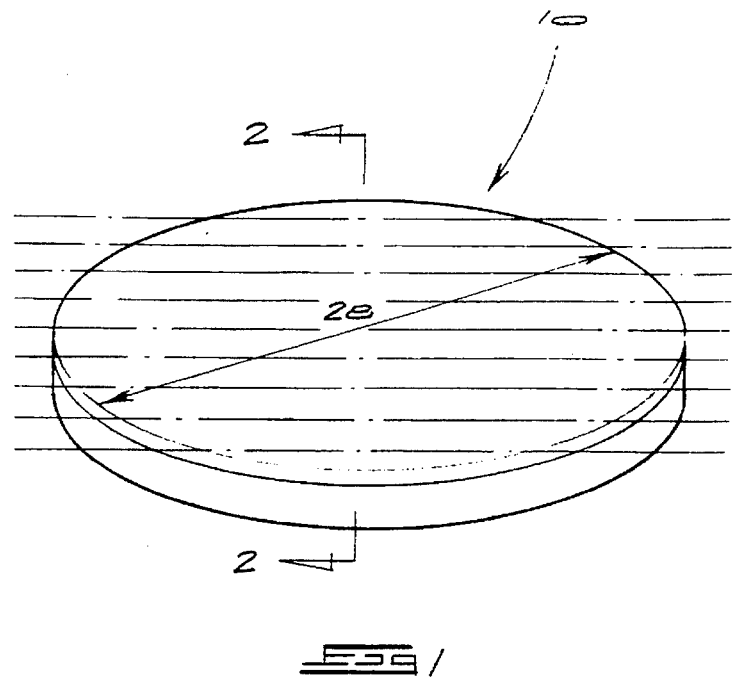
FIG. 1 illustrates diagrammatically how a blank is sliced up in the production of the cutting inserts used in the drill bit of FIGS. 3 to 8.
Figure 2:
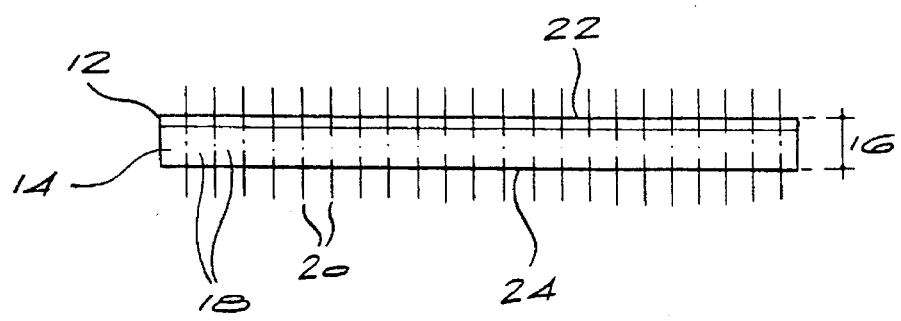
FIG. 2 shows a side view of the blank seen in FIG. 1.

FIGS. 1 and 2 illustrate a blank 10 from which a great number of cutting inserts for use in drill bits can be produced in accordance with the invention. The blank in this case is a SYNDITE (trade mark) blank which is of generally circular shape and which is manufactured by the applicant. The SYNDITE (trade mark) blank is a composite PCD compact consisting of a thin PCD compact 12 bonded to a tungsten carbide backing 14, and it typically has a thickness 16 of about 8 mm.

To produce cutting inserts for use as described below, the blank 10 is cut into slices 18 along slice lines 20 which are at right angles to the major surfaces 22 and 24 of the blank.

The SYNDITE blank 10 may have a substantial nominal diameter 28, typically of up to 70 mm, which determines the maximum possible length dimension of a cutting insert that can be produced using the slicing technique just described. In most cases, however, the slices 18 are then cut up lengthwise to form cutting inserts of appropriate dimension for use in a drill bit, as described below.

FIG. 3 shows an axial view on the leading face of a coring drill bit designed for drilling into rock formations and for extracting solid cylindrical cores from those formations, generally for the purpose of geological analysis or in prospecting operations. As seen in this Figure, the body 30 of the coring bit is of hollow cylindrical shape, so that the leading face 30 has an annular configuration. Cutting inserts 34, 36 and 38 are set into angularly spaced, radially oriented recesses in the face. The inserts 34, 36 and 38 are identical and are in the form of segments cut from slices of a blank 10, as described above. Each of the inserts has a PCD compact 40 bonded to a tungsten carbide backing 42. As will be clear from FIG. 3, the inserts 34 are set into the relevant recesses in such a manner that their PCD compacts 40 are exposed slightly above face 32 and extend from the inner gauge 44 of the bit body to the outer gauge 46 thereof. During drilling, with the drill bit rotating about its axis and urged in the axial direction, the cutting inserts 34 will perform an axial cutting action.

The two cutting inserts 36 are set into the relevant recesses with their PCD compacts flush with the inner gauge 44. The two cutting inserts 38 are reversed with respect to the cutting inserts 36 and are set into the relevant recesses so that their PCD compacts are flush with the outer gauge 46. During drilling, the inserts 36 and 38 serve to maintain the inner and outer gauges cut by the inserts 34. Since they are not intended to perform any appreciable axial cutting action, this being the task of the inserts 34, the inserts 36 and 38 can be set back axially in the face 32 relative to the inserts 34.

FIG. 5 shows a view similar to that of FIG. 3 of another embodiment of coring drill bit. In this case, axial cutting as well as inner and outer gauge maintenance is performed by four cutting insert clusters. A typical cutting insert cluster 50 is illustrated in FIGS. 6 and 7. As will be evident from these Figures, the assembly 50 consists of three separate cutting inserts 54, 56 and 58 arranged side-by-side with one another.

The inserts 54, 56 and 58 correspond in shape and orientation to the inserts 34, 36 and 38 respectively of the preceding embodiment, with the inserts 54 performing axial cutting and the inserts 56 and 58 maintaining the inner gauge and outer gauges respectively.

FIG. 8 illustrates a non-coring drill bit. In this case, there are three radially oriented cutting inserts 60, 62 and 64 set into appropriate recesses in the leading face 66 of the drill bit body. The inserts 60, 62 and 64 have different lengths in the radial sense and they are spaced apart by 120°. As in the case of the cutting inserts 34 and 54, they stand slightly proud of the leading face 66 to as to perform an axial cutting action during drilling.

It will be seen that each of the inserts extends from the outer gauge of the face 66 towards the centre of the face, but that the inner ends of the inserts are at different distances from the central axis of the bit. With this arrangement the cutting inserts are able to sweep out the full area of a circle and the bit is therefore capable of drilling into a rock formation to form a hole of round cylindrical shape.

The inserts 60, 62 and 64 used in the FIG. 8 embodiment are formed in the same way as the inserts 34, 36, 38 and the inserts 54, 56 and 58, with the major difference being that they are considerably longer. In each embodiment, the inserts are typically anchored by brazing them into the relevant recesses in the bit body, although other suitable fixing methods such as clamping can also be used. Moreover, FIG. 8 also illustrates another advantageous feature of the present invention, wherein the cutting inserts 60, 62 and 64 have different radial lengths and extend towards the periphery of the leading face from respective positions at different distances from the axis of the bit.

In each case, typical cutting insert dimensions would be as follows:

| | |
|---|---|
| Thickness | 1 mm upwards |
| Height | 5 mm to 10 mm |
| Width (length) | 5 mm to 40 mm |

In the case of inserts using PCD compacts, the thickness of the diamond layer will typically be in the range 0.7 mm to 1.5 mm.

It is believed that a drill bit incorporating cutting inserts as described with reference to FIGS. 3 to 8 will be suitable for drilling in soft to medium rock formations such as clay, sandstone and shale.

It should also be noted that instead of a PCD compact providing the cutting tip of the cutting insert in the various embodiments of the invention, a PCBN (polycrystalline cubic boron nitride) could be used.

Although reference is made in this specification to the slicing of a single PCD or PCBN composite compact or blank to produce the cutting inserts which are then used in the drill bit, it will readily be appreciated that in practice not all of the cutting inserts in one drill bit will necessarily emanate from the same original composite compact. The invention also embraces the situation where cutting inserts emanating from different composite compacts are used in the same drill bit.

Also, while specific mention has been made of a SYN-DITE blank as the source for the cutting elements, it should be noted that the invention is in no way limited to the use of this particular form of blank. In other embodiments, different PCD or PCBN composite compacts could be used as a source for the cutting inserts.

I claim:

1. A drill bit comprising:

a. a bit body having a leading face and at least one gauge surface;

b. a series of cutting inserts set into the bit body, each cutting insert being in the form of a segment cut from a slice of a composite PCD or PCBN compact of flat proportions, and each cutting insert including a PCD or PCBN compact carried by a carbide backing, the PCD or PCBN compact of each insert being exposed at the leading face or at a gauge surface of the bit body, wherein the cutting inserts are arranged in clusters of three inserts each, the three cutting inserts in each cluster being arranged for their PCD or PCBN compacts to be exposed at the leading face and inner and outer gauge surfaces respectively, and further wherein the cutting inserts are identical but are arranged at different orientations to provide for exposure of PCD or PCBN compacts at the leading face and inner and outer gauge surfaces; and c. the drill bit is a coring bit in which the bit body is of tubular shape with inner and outer gauge surfaces, and wherein some of the cutting inserts are arranged with their PCD or PCBN compacts exposed at the leading face to perform an axial drilling action, some of the cutting inserts are arranged with their PCD or PCBN compacts exposed at the inner gauge surface to perform an inner gauge maintenance action, and some of the cutting inserts are arranged with their PCD or PCBN compacts exposed at the outer gauge surface to perform an outer gauge maintenance action.

2. A drill bit comprising:

a. a bit body having a leading face and at least one gauge surface, and wherein the drill bit is a coring bit in which the bit body is of tubular shape with inner and outer gauge surfaces; and b. a series of cutting inserts set into the bit body, the cutting inserts consisting of segments cut from slices of composite PCD or PCBN compacts which are of flat proportions and which have spaced apart major surfaces, the slices being formed by cutting through the composite compacts in parallel, spaced apart planes transverse to the major surfaces, and each cutting insert consisting of a PCD or PCBN compact carried by a carbide backing, and wherein some of the cutting inserts are arranged with their PCD or PCBN compacts exposed at the leading face to perform an axial drilling action, some of the cutting inserts are arranged with their PCD or PCBN compacts exposed at the inner gauge surface to perform an inner gauge maintenance action, and some of the cutting inserts are arranged with their PCD or PCBN compacts exposed at the outer gauge surface to perform an outer gauge maintenance action.

3. A drill bit according to claim 2, wherein the cutting inserts are identical but are arranged at different orientations to provide for exposure of PCD or PCBN compacts at the leading face and inner and outer gauge surfaces.

4. A drill bit according to claim 3, wherein the cutting inserts are arranged in clusters of three inserts each, the three cutting inserts in each cluster being arranged for their PCD or PCBN compacts to be exposed at the leading face and inner and outer gauge surfaces respectively.

5. A drill bit comprising:

a. a bit body having a leading face and at least one gauge surface;

b. a series of cutting inserts set into the bit body, the cutting inserts consisting of segments cut from slices of composite PCD or PCBN compacts which are of flat proportions and which have spaced apart major surfaces, the slices being formed by cutting through the composite compacts in parallel, spaced apart planes transverse to the major surfaces, and each cutting insert consisting of a PCD or PCBN compact carried by a carbide backing, with the PCD or PCBN compact of each insert being exposed at the leading face or at a gauge surface of the bit body; and c. said drill bit being a non-coring bit wherein the cutting inserts are arranged with the PCD or PCBN compacts exposed at the leading face and extending substantially radially from positions at or near the axis of the bit towards the periphery of the leading face, and wherein the cutting inserts are arranged for their PCD or PCBN compacts to sweep out the full area of a circle when the bit is rotated about its axis, and wherein the cutting inserts have different radial lengths and extend towards the periphery of the leading face from respective positions at different distances from the axis of the bit.

\* \* \* \* \*